US011707722B2

(12) United States Patent
Hirata et al.

(10) Patent No.: US 11,707,722 B2
(45) Date of Patent: Jul. 25, 2023

(54) INORGANIC NANOPARTICLE-COATED HOLLOW PARTICLES, METHOD FOR PRODUCING THE SAME, AND AQUEOUS DISPERSION CONTAINING THE HOLLOW PARTICLES

(71) Applicant: ZEON CORPORATION, Tokyo (JP)

(72) Inventors: Takeshi Hirata, Tokyo (JP); Nozomi Yabuki, Tokyo (JP)

(73) Assignee: ZEON CORPORATION, Tokyo (JP)

(*) Notice: Subject to any disclaimer, the term of this patent is extended or adjusted under 35 U.S.C. 154(b) by 321 days.

(21) Appl. No.: 17/277,375

(22) PCT Filed: Sep. 11, 2019

(86) PCT No.: PCT/JP2019/035698
§ 371 (c)(1),
(2) Date: Mar. 18, 2021

(87) PCT Pub. No.: WO2020/066623
PCT Pub. Date: Apr. 2, 2020

(65) Prior Publication Data
US 2021/0354102 A1    Nov. 18, 2021

(30) Foreign Application Priority Data

Sep. 28, 2018 (JP) .................. 2018-184914

(51) Int. Cl.
*B01J 13/00* (2006.01)
*B05D 7/00* (2006.01)
(Continued)

(52) U.S. Cl.
CPC ............. *B01J 13/04* (2013.01); *B01J 13/14* (2013.01); *B01J 13/22* (2013.01); *C08F 2/18* (2013.01);
(Continued)

(58) Field of Classification Search
CPC ................... Y10T 428/2991; Y10T 428/2998
See application file for complete search history.

(56) References Cited

U.S. PATENT DOCUMENTS 6,093,487 A * 7/2000 Dupuis .................. C01F 11/18
428/407
2010/0048394 A1  2/2010 Horn et al.
(Continued)

FOREIGN PATENT DOCUMENTS

JP       2009-108146 A      5/2009
JP       2009108146 A   *  5/2009
(Continued)

OTHER PUBLICATIONS

Translation WO-2004 067638 A1 (Year: 2004).*
(Continued)

*Primary Examiner* — Hoa Le
(74) *Attorney, Agent, or Firm* — WHDA, LLP

(57) ABSTRACT

Provided are hollow particles which are more excellent in heat resistance and dispersibility than ever before and which are lightweight. The hollow particles containing hollow resin particles having a surface covered with inorganic fine particles, wherein a volume average particle diameter of the hollow particles is from 0.1 μm to 9.0 μm, and a void ratio thereof is from 55% to 95%; wherein a repeating unit constituting the resin of the hollow resin particles contains a crosslinkable monomer unit, and a content of the crosslinkable monomer unit is from 25 to 100 parts by mass, with respect to 100 parts by mass of the resin; wherein a primary particle diameter of the inorganic fine particles is from 10 nm to 120 nm; and wherein the inorganic fine particles are contained at from 5 to 180 parts by mass, with respect to 100 parts by mass of the hollow resin particles.

7 Claims, 4 Drawing Sheets

(51) Int. Cl.

| | |
|---|---|
| *B32B 5/16* | (2006.01) |
| *B01J 13/04* | (2006.01) |
| *B01J 13/14* | (2006.01) |
| *B01J 13/22* | (2006.01) |
| *C08F 2/18* | (2006.01) |
| *C08F 12/36* | (2006.01) |
| *C08F 20/06* | (2006.01) |
| *C08F 20/14* | (2006.01) |
| *C08F 20/40* | (2006.01) |
| *B82Y 30/00* | (2011.01) |
| *B82Y 40/00* | (2011.01) |

(52) U.S. Cl.
CPC .............. *C08F 12/36* (2013.01); *C08F 20/06* (2013.01); *C08F 20/14* (2013.01); *C08F 20/40* (2013.01); *B82Y 30/00* (2013.01); *B82Y 40/00* (2013.01)

(56) References Cited

U.S. PATENT DOCUMENTS

| | | | |
|---|---|---|---|
| 2021/0087349 A1* | 3/2021 | Iga | C08F 2/32 |
| 2022/0251247 A1* | 8/2022 | Hirata | C09D 133/064 |

FOREIGN PATENT DOCUMENTS

| | | | | |
|---|---|---|---|---|
| JP | 2012-007056 A | | 1/2012 | |
| WO | WO-2004067638 A1 * | | 8/2004 | ............... C08J 5/24 |

OTHER PUBLICATIONS

Caruso et al., Production of Hollow Microspheres from Nanostructured Composite Particles, Chem. Mater. 1999, 11, 3309-3314. (Year: 1999).*

Narongthong Jirawat et al: "One-pot synthesis of organic-inorganic hybrid hollow latex particles via Pickering and seeded emulsion polymerizations", Colloid & Polymer Science, Springer Verlag, Heidelberg, DE, vol. 293, No. 4, Feb. 3, 2015 (Feb. 3, 2015), pp. 1269-1274; Cited in Extended European Search Report dated Feb. 28, 2022. (6 pages).

The Extended European Search Report dated Feb. 28, 2022, issued in counterpart EP application No. 19867363.4. (10 pages).

Notification of Transmittal of Translation of the International Preliminary Report on Patentability (Form PCT/IB/338) issued in counterpart International Application No. PCT/JP2019/035698 dated Apr. 8, 2021 with Forms PCT/IB/373 and PCT/ISA/237. (7 pages).

Office Action dated Oct. 20, 2022, issued in counterpart EP application No. 19867363.4. (3 pages).

* cited by examiner

INORGANIC NANOPARTICLE-COATED HOLLOW PARTICLES, METHOD FOR PRODUCING THE SAME, AND AQUEOUS DISPERSION CONTAINING THE HOLLOW PARTICLES

TECHNICAL FIELD

The present disclosure relates to hollow particles which are more excellent in heat resistance and dispersibility than ever before and which are lightweight. The present disclosure also relates to a method for producing the hollow particles, and an aqueous dispersion containing them.

BACKGROUND ART

Hollow particles can scatter light well and can reduce light transmissivity, compared to particles having practically no voids in their interiors. Accordingly, they are widely used in the applications of aqueous coating materials, paper coating compositions and so on, in the form of organic pigments and masking agents excellent in optical properties such as opacity and whiteness.

Meanwhile, in the applications of aqueous coating materials, paper coating compositions and so on, it is desired to increase the void ratio of blended hollow particles, in order to improve effects such as the weight reduction, heat insulating properties and opacification of the coating materials, paper coating compositions and so on. However, conventionally known production methods have a problem in that it is difficult to produce hollow particles with a high void ratio and excellent heat resistance, while controlling the diameter of the particles.

For example, Patent Literature 1 discloses hollow resin particles in which a resin containing fine particles is used as the shell. The literature mentions that such hollow resin particles have high shell strength.

In addition, Patent Literature 2 discloses a method for producing hollow resin particles, wherein a resin constituting the outer wall surface of the particles contains an inorganic fine particle filler, and the particles are produced through at least the steps of preparing a polymerizable composition containing at least an inorganic fine particle filler, a polymerizable monomer, an organic solvent and a polymerization initiator, suspending the composition in a solvent (dispersion medium) not compatible with the composition to obtain a suspension, and carrying out suspension polymerization to grow a polymerization product, using the inorganic fine particle filler as a nucleus, and wherein the inorganic fine particle filler has an average particle diameter of from 1 nm to 100 nm, and it is uniformly dispersed in the resin constituting the outer wall surface. This literature mentions that, since the inorganic fine particle filler is present in the state of being dispersed in the resin constituting the outer wall surface of the hollow resin particles, the method does not cause such a conventional problem, that the inorganic fine particle filler peels off from the hollow resin particles.

CITATION LIST

Patent Literature

[Patent Literature 1] Japanese Patent Application Laid-Open (JP-A) No. 2009-108146
[Patent Literature 2] JP-A No. 2012-7056

SUMMARY OF INVENTION

Technical Problem

The hollow resin particles disclosed in Patent Literature 1 have a problem in that sufficient heat resistance cannot be obtained since a polyurethane resin is contained as the shell.

Further, the hollow resin particles disclosed in Patent Literature 2 have a problem in that it is difficult to reduce the weight, which is a characteristic of hollow resin particles, because the porosity is not sufficiently high.

An object of the present disclosure is to provide hollow particles which are more excellent in heat resistance and dispersibility than ever before and which are lightweight. Another object of the present disclosure is to provide a method for producing the hollow particles, and an aqueous dispersion containing them.

Solution to Problem

The present inventors have examined physical properties required for obtaining hollow particles which are more excellent in heat resistance and dispersibility than ever before and which are lightweight. As a result, the present inventors found that hollow particles satisfying specific conditions have excellent heat resistance and dispersibility and are lightweight.

The hollow particles of the present disclosure are hollow particles comprising hollow resin particles having a surface covered with inorganic fine particles, wherein a volume average particle diameter of the hollow particles is from 0.1 μm to 9.0 μm, and a void ratio thereof is from 55% to 95%; wherein a repeating unit constituting the resin of the hollow resin particles contains a crosslinkable monomer unit, and a content of the crosslinkable monomer unit is from 25 parts by mass to 100 parts by mass, with respect to 100 parts by mass of the resin; wherein a primary particle diameter of the inorganic fine particles is from 10 nm to 120 nm; and wherein the inorganic fine particles are contained at from 5 parts by mass to 180 parts by mass, with respect to 100 parts by mass of the hollow resin particles.

In the present disclosure, a coverage of the hollow particles with the inorganic fine particles may be from 60% to 180%.

The hollow particle production method of the present disclosure is a method for producing the hollow particles, the method comprising a step comprising obtaining the hollow resin particles by, without expanding a hollow resin particle precursor including an organic solvent, removing the organic solvent from the hollow resin particle precursor.

The aqueous dispersion of the present disclosure is an aqueous dispersion comprising the hollow resin particles.

Advantageous Effects of Invention

According to the present disclosure as described above, the hollow particles can exhibit excellent heat resistance and dispersibility and are lightweight, since the hollow particles contain the specific hollow resin particles and inorganic fine particles, and the volume average particle diameter and void ratio are in the specific ranges.

BRIEF DESCRIPTION OF DRAWINGS

In the accompanying drawings.

DESCRIPTION OF EMBODIMENTS

Figure 1:
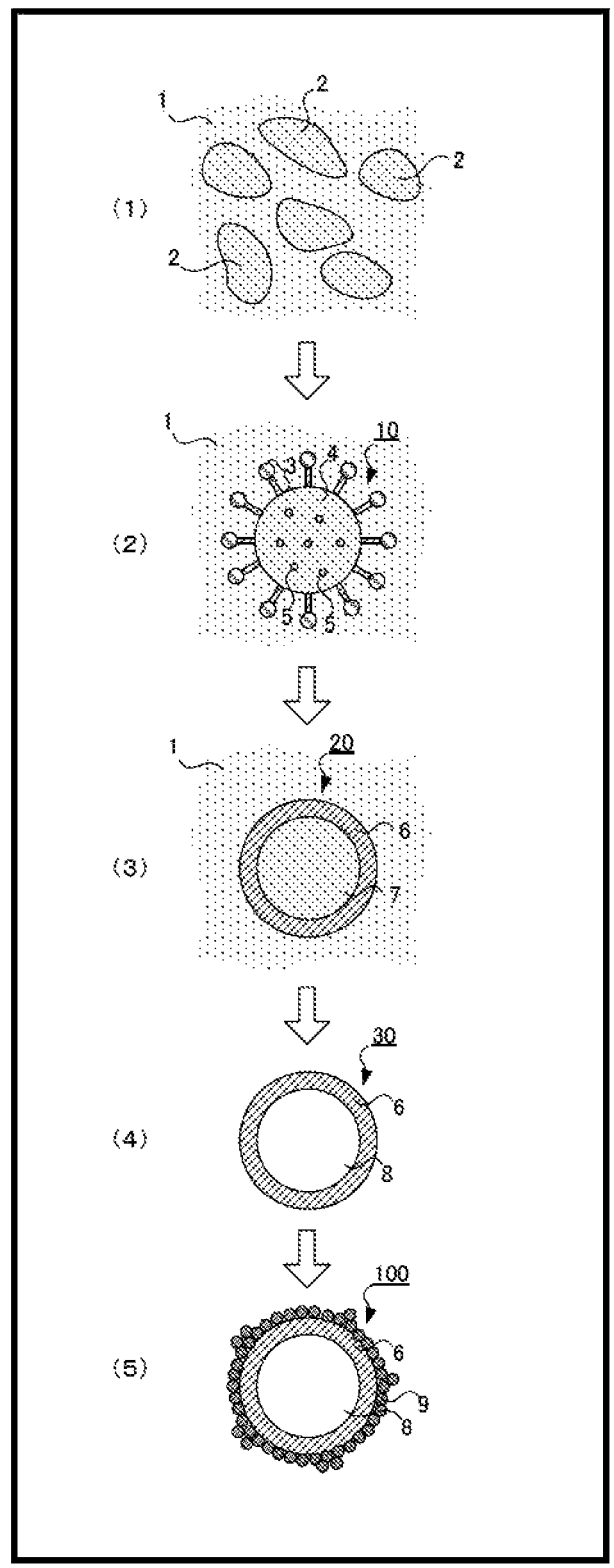
FIG. 1 is a schematic diagram showing an embodiment of the production method of the present disclosure.

In the present disclosure, the term "hollow" means a state where the presence of at least one selected from the group consisting of a liquid portion, a gas portion (a portion of the gas which is at a reduced pressure close to vacuum is also included. The same applies to the following) and a mixed portion of liquid and gas can be found in the interior of a particle by a general observation method. Also in the present disclosure, the term "liquid portion" means a continuous portion filled with liquid. Also in the present disclosure, the term "gas portion" means a continuous portion filled with gas. Also in the present disclosure, the term "mixed portion of liquid and gas" means a continuous portion filled with liquid and gas.

In the present disclosure, the term "hollow portion" means a hollow portion in the interior of a particle. It can be determined whether a particle has a hollow portion or not, by SEM observation of a cross section of a target particle or by TEM observation of a target particle as it is, for example.

The resin shell of a particle may have no communication hole, and the "hollow portion" in the present disclosure may be isolated from the outside of the particle by the shell of the particle.

The resin shell of the particle may have one or two or more communication holes, and in the present disclosure, the "hollow portion" may communicate with the outside of the particle through the communication hole(s).

In the present disclosure, the term "hollow resin particle" means a resin particle in which the hollow portion is filled with gas. In the present disclosure, the term "hollow particle" means a particle formed by covering the surface of the hollow resin particle with inorganic fine particles. In other words, the "hollow particle" includes a hollow resin particle and inorganic fine particles covering the surface of the hollow resin particle.

1. Hollow Particles

The hollow particles of the present disclosure are hollow particles comprising hollow resin particles having a surface covered with inorganic fine particles, wherein a volume average particle diameter of the hollow particles is from 0.1 μm to 9.0 μm, and a void ratio thereof is from 55% to 95%; wherein a repeating unit constituting the resin of the hollow resin particles contains a crosslinkable monomer unit, and a content of the crosslinkable monomer unit is from 25 parts by mass to 100 parts by mass, with respect to 100 parts by mass of the resin; wherein a primary particle diameter of the inorganic fine particles is from 10 nm to 120 nm; and wherein the inorganic fine particles are contained at from 5 parts by mass to 180 parts by mass, with respect to 100 parts by mass of the hollow resin particles.

The properties required for the hollow particles include excellent heat resistance, dispersibility and lightness. In the present disclosure, the dispersibility of the hollow particles means the dispersibility of the hollow particles in a predetermined medium (e.g., an aqueous medium). For the hollow particles of the present disclosure, being lightweight means the property that the mass of the hollow particles is small compared with the mass of particles having the same particle size and apparent volume. Being lightweight may be referred to as the lightness of the hollow particles. The hollow particles may also require heat insulating properties and mechanical strength. To obtain these properties, it is necessary that the five physical property parameters relating to the hollow particles, that is, the volume average particle diameter and void ratio of the hollow particles, the content of the crosslinkable monomer unit in the resin contained in the hollow resin particles contained in the hollow particles, and the primary particle diameter and content of the inorganic fine particles contained in the hollow particles are within the specific numerical ranges. Hereinafter, the outline of the relationship between the five physical property parameters and the characteristics (such as heat resistance, lightness and dispersibility) will be described.

The volume average particle diameter of the hollow particles is a parameter that mainly relates to the heat resistance. Since the volume average particle diameter of the hollow particles is within the specific range, the dispersibility and mechanical strength of the hollow particles are compatible; collapse and deformation do not occur when a load is applied in a high temperature environment; and the heat insulating properties and lightness can be maintained. Accordingly, it is considered that the hollow particles can exhibit excellent heat resistance.

Next, the void ratio of the hollow particles is a parameter mainly relating to the heat resistance and heat insulating properties. The hollow portion of the hollow particles is generally less susceptible to heat transfer than the case where the resin is present in the portion. Therefore, the ratio of the hollow portion to the hollow resin particles increases with an increase in void ratio. Accordingly, it is considered that the hollow resin particles have excellent heat resistance and heat insulating properties.

Meanwhile, the content of the crosslinkable monomer unit in the resin of the hollow resin particles is a parameter relating to the heat resistance and mechanical strength of the obtained hollow particles. As the content of the crosslinkable monomer unit in the resin increases, the covalent bond network is more tightly strung in the resin. As a result, it is considered that the hollow particles are less likely to deform even with respect to heat or the like applied from the outside.

The primary particle size of the inorganic fine particles is a parameter relating to the dispersibility of the obtained hollow particles. It is considered that, since the primary particle diameter of the inorganic fine particles is within the specific range, the inorganic fine particles uniformly cover the surface of the hollow resin particles, and aggregation of the hollow resin particles brought into contact with each other, can be suppressed.

The content of the inorganic fine particles is a parameter relating to the dispersibility and weight reduction of the obtained hollow particles. Since the content of the inorganic fine particles is within the specific range, it is considered that the inorganic fine particles can cover the surface of the hollow resin particles without excess or deficiency and without impairing the advantage of reducing the weight of the hollow particles.

Thus, the five physical property parameters for the hollow particles affect the above-mentioned properties (such as heat resistance, lightness and dispersibility).

Hereinafter, the details of the hollow resin particles and the inorganic fine particles, which are raw materials, and the whole hollow particles (including the above-mentioned parameters) will be described in order.

(1) Hollow Resin Particle

The repeating unit constituting the resin of the hollow resin particle contains a crosslinkable monomer unit.

In the present disclosure, the crosslinkable monomer means a compound having two or more polymerizable functional groups. The mechanical properties of the shell of the obtained hollow resin particle can be enhanced by using the crosslinkable monomer. Further, since the crosslinkable monomer has a plurality of polymerizable functional groups, non-crosslinkable monomers, which will be described later, can be linked together, and especially, the heat resistance of the obtained hollow resin particle can be enhanced.

The crosslinkable monomer is not particularly limited, as long as it has two or more polymerizable functional groups. Examples of the crosslinkable monomer include: an aromatic divinyl compound such as divinyl benzene, divinyl naphthalene, diallylphthalate and derivatives thereof; an ester compound such as allyl (meth)acrylate, ethylene glycol di(meth)acrylate and diethylene glycol di(meth)acrylate, in which two or more compounds having a carbon-carbon double bond are esterified to a compound having two or more hydroxyl or carboxyl groups; a diene compound such as butadiene and isoprene; and other divinyl compound such as N,N-divinylaniline and divinyl ether. Among them, divinyl benzene and ethylene glycol di(meth)acrylate are preferable.

The content of the crosslinkable monomer unit is generally from 25 parts by mass to 100 parts by mass, preferably from 30 parts by mass to 95 parts by mass, more preferably from 32 parts by mass to 90 parts by mass, and still more preferably from 35 parts by mass to 85 parts by mass, with respect to 100 parts of the resin. When the content of the crosslinkable monomer unit is from 25 parts by mass to 100 parts by mass, the strength of the shell of the obtained hollow resin particles can be kept high. Further, since the shell strength is high, the hollow resin particles do not dent and, as a result, can keep a high void ratio.

The content of the crosslinkable monomer unit is determined, for example, by calculating the ratio of the crosslinkable monomer subjected to the polymerization reaction from the amount of the crosslinkable monomer at the time of the polymerization and the residual amount of the crosslinkable monomer at the end of the polymerization.

The repeating unit constituting the resin of the hollow resin particles may contain a non-crosslinkable monomer unit.

In the present disclosure, the non-crosslinkable monomer means a compound having one polymerizable functional group. Examples of the non-crosslinkable monomer include a monovinyl monomer and a hydrophilic monomer.

In the present disclosure, the monovinyl monomer means a compound having one polymerizable vinyl functional group, and it is a compound other than the hydrophilic monomer described later. Polymerization of the monovinyl monomer forms a resin containing a monovinyl monomer unit.

In the present disclosure, examples of the monovinyl monomer include at least one acrylic-based monovinyl monomer selected from the group consisting of acrylate and methacrylate; an aromatic monovinyl monomer such as styrene, vinyltoluene, α-methylstyrene, p-methylstyrene and halogenated styrene; a mono-olefin monomer such as ethylene, propylene and butylene; a carboxylic acid vinyl ester monomer such as vinyl acetate; a halogenated vinyl monomer such as vinyl chloride; a halogenated vinylidene monomer such as vinylidene chloride; and a vinyl pyridine monomer. The monovinyl monomer may be at least one acrylic-based monovinyl monomer selected from the group consisting of acrylate and methacrylate.

In the present disclosure, (meth)acrylate means acrylate and methacrylate. Examples of the (meth)acrylate as the monovinyl monomer include alkyl (meth)acrylate such as methyl (meth)acrylate, ethyl (meth)acrylate, butyl (meth)acrylate, 2-ethylhexyl (meth)acrylate and lauryl (meth)acrylate, and glycidyl (meth)acrylate. These (meth)acrylates may be used alone or in combination of two or more kinds.

Among the (meth)acrylates described above, at least one selected from the group consisting of butyl acrylate and methyl methacrylate is preferably used. These monovinyl monomers may be used alone or in combination of two or more kinds.

Thus, by using a monomer which is resistant to relatively high temperature conditions, such as (meth)acrylate which is used as the monovinyl monomer, the heat resistance of the obtained hollow resin particles can be enhanced as compared to, for example, the case of using a monomer having a nitrile group.

In the present disclosure, the hydrophilic monomer means a water-soluble compound. More specifically, it means a compound having a water solubility of 1% by mass or more. It is particularly preferable to use the hydrophilic monomer for the polymerization, since the obtained hollow resin particles contain less aggregates.

In the present disclosure, examples of the hydrophilic monomer include an acid group-containing monomer, a hydroxyl group-containing monomer, an amide group-containing monomer and a polyoxyethylene group-containing monomer.

In the present disclosure, the acid group-containing monomer means a monomer containing an acid group. The acid group includes both a proton-donating group (a Brønsted acid group) and an electron pair-accepting group (a Lewis acid group). It is preferable to use the acid group-containing monomer as the hydrophilic monomer, since hollow resin particles with high heat resistance are obtained.

The acid group-containing monomer is not particularly limited, as long as it has an acid group. Examples thereof include an ethylenically unsaturated carboxylic acid monomer such as acrylic acid, methacrylic acid, crotonic acid, cinnamic acid, itaconic acid, fumaric acid, maleic acid and butenetricarboxylic acid; a carboxyl group-containing monomer such as a monoalkyl ester of unsaturated dicarboxylic acid, such as monoethyl itaconate, monobutyl fumarate and monobutyl maleate; and a sulfonic acid group-containing monomer such as styrenesulfonic acid. Among the acid group-containing monomers, the ethylenically unsaturated carboxylic acid monomer is preferably used; a maleic acid monomer or at least one acrylic-based hydrophilic monomer selected from the group consisting of acrylic acid and methacrylic acid, is more preferably used; and the acrylic-based hydrophilic monomer is still more preferably used. In the case where the acrylic-based hydrophilic monomer ((meth)acrylic acid) and the above-described acrylic-based monovinyl monomer ((meth)acrylate) are used in combination, the mass ratio of the (meth)acrylic acid to the (meth)acrylate is preferably from 100:0 to 30:70, and more preferably from 95:5 to 35:65. By using the monomer resistant to relatively high temperature conditions in combination, such as the (meth)acrylic acid and the above-mentioned (meth)acrylate used as the monovinyl monomer, the heat resistance of the obtained hollow resin particles can be enhanced as compared to, for example, the case of using a monomer having a nitrile group. Thus, it is preferable to use the (meth)acrylic acid and the acrylic-based monovinyl monomer in combination. In the present disclosure, the term "(meth)acrylic acid" means acrylic acid and methacrylic acid.

It is preferable to use a hydroxyl group-containing monomer as the hydrophilic monomer, since the amount of aggregates in a latex thus obtained, can be reduced to a small level. Examples of the hydroxyl group-containing monomer include a 2-hydroxyethyl acrylate monomer, a 2-hydroxyethyl methacrylate monomer, a 2-hydroxypropyl acrylate monomer, a 2-hydroxypropyl methacrylate monomer, and a 4-hydroxybutyl acrylate monomer.

Examples of the amide group-containing monomer include a (meth)acrylamide monomer such as (meth)acrylamide, dimethyl (meth)acrylamide, N-methylol (meth)acrylamide and N-butoxymethyl (meth)acrylamide, and derivatives thereof.

Examples of the polyoxyethylene group-containing monomer include a methoxypolyethylene glycol acrylate monomer and a methoxypolyethylene glycol methacrylate monomer.

These hydrophilic monomers may be used alone or in combination of two or more kinds.

In addition to the above-mentioned non-crosslinkable monomer and crosslinkable monomer, other polymerizable monomers may be contained as the monomer.

In addition to the above-mentioned resin, the resin constituting the hollow resin particles may contain, for example, urethane resin or epoxy resin. Among these resins, for example, the resin constituting the hollow resin particles may contain urethane resin, since it has excellent heat insulating properties, or the resin constituting the hollow resin particles may contain epoxy resin, since high compressive strength is expected to be obtained.

The shape of the hollow resin particles is not particularly limited, as long as the hollow portion is formed in the interior. The examples of the shape include a spherical shape, an ellipsoidal shape, and an irregular shape. Among them, a spherical shape is preferable in terms of ease of production. When the hollow resin particles have a communicating hole connecting the hollow portion and the outside of the particles, the shape of the hollow resin particles is determined as the outer shape of the particles of the case where that the communicating hole is assumed to be not present.

The interior of the hollow resin particles has one or two or more hollow portions. The interior of the hollow resin particles may be porous, as long as one or more hollow portions are formed. The interior of the hollow resin particles preferably has 5 or less hollow portions, more preferably 3 or less hollow portions, still more preferably 2 or less hollow portions, and particularly preferably one hollow portion, in order to keep good balance between the high void ratio of the hollow resin particles and the compressive strength of the hollow resin particles.

The average circularity of the hollow resin particles may be from 0.950 to 0.995, may be from 0.970 to 0.995, or may be from 0.980 to 0.995.

In the present disclosure, "circularity" is defined as a value obtained by dividing the perimeter of a circle having the same area as the projected area of a particle image, by the perimeter of the particle image. Also in the present disclosure, "average circularity" is used as a simple method for quantitatively representing the shape of the hollow resin particles, and it is an index of the degree of the surface roughness of the hollow resin particles. The average circularity is 1 when the hollow resin particles are perfectly spherical, and it gets smaller as the surface shape of the hollow resin particles becomes more complex.

When the hollow resin particles of the present disclosure have the shell, the shell thickness may be from 0.01 μm to 1.0 μm, may be from 0.02 μm to 0.95 μm, or may be from 0.05 μm to 0.90 μm.

When the shell thickness is 0.01 μm or more, the hollow resin particles can keep such a higher compressive strength that allows the particles to maintain the shape thereof. When the shell thickness is 1.0 μm or less, the hollow portion in the interior of the hollow resin particles, can obtain a larger volume.

The method for measuring the shell thickness of the hollow resin particles is as follows. First, 20 hollow resin particles are selected as the object of the measurement. SEM observation of the cross sections of the hollow resin particles is carried out. Next, from the thus-obtained SEM images of the cross sections of the particles, the thicknesses of the shells of the 20 hollow resin particles are measured. The average of the thicknesses is determined as the shell thickness of the hollow resin particles.

The image of the shape of the hollow resin particles may be, for example, a bag which is made of a thin film and which is swollen with gas. A cross-sectional diagram of the bag looks like a hollow resin particle 30 shown in FIG. 1 described later. In this example, the outermost layer of the hollow resin particle is made of one thin film, and the interior is filled with gas.

The shape of the hollow resin particles can be determined by SEM or TEM, for example. Further, the shape of the interior of the hollow resin particles can be determined by cutting the particles into round slices by a known method and then observing the slices by SEM or TEM.

(2) Inorganic Fine Particles

Since the surface of the hollow particles of the present disclosure is covered with the inorganic fine particles, they have excellent dispersibility. By selecting the type of the inorganic fine particles, desired properties can be imparted to the hollow particles. For example, by using inorganic fine particles having hydrophilicity, hydrophilicity can be imparted to the hollow particles. By using inorganic fine particles having at least one of water repellency and lipophilicity, at least one of water repellency and lipophilicity can be imparted to the hollow particles.

The primary particle diameter of the inorganic fine particles is generally from 10 μm to 120 μm, preferably from 15 μm to 90 μm, and more preferably from 20 μm to 80 μm. When the primary particle diameter of the inorganic fine particles is 10 nm or more, the inorganic fine particles function as a spacer for suppressing contact between the hollow resin particles, and the obtained hollow particles are excellent in dispersibility. When the primary particle diameter of the inorganic fine particles is 120 nm or less, the inorganic fine particles can easily cover the hollow resin particles uniformly, and the obtained hollow particles are excellent in dispersibility. In the present disclosure, the primary particle diameter of the inorganic fine particles means the average primary particle diameter.

The content of the inorganic fine particles is generally from 5 parts by mass to 180 parts by mass, preferably from 10 parts by mass to 140 parts by mass, and more preferably from 20 parts by mass to 130 parts by mass, with respect to 100 parts of the hollow resin particles. When the content of the inorganic fine particles is 5 parts by mass or more, the hollow resin particles can be covered with a sufficient amount of the inorganic fine particles, and the dispersibility of the hollow particles can be enhanced. When the content of the inorganic fine particles is 180 parts by mass or less, even if the inorganic fine particles have a large specific gravity, the effect of reducing the weight of the obtained hollow particles is less likely to be impaired.

The coverage of the hollow particles with the inorganic fine particles may be from 60% to 180%. From the viewpoint of dispersibility, the coverage is preferably from 65% to 175%, and more preferably from 70% to 175%. From the viewpoint of both dispersibility and weight reduction, the coverage is preferably from 65% to 170%, and more preferably from 70% to 160%.

The method for calculating the coverage is as follows. From the particle diameter and apparent density (g/cm$^3$) of the hollow resin particles, and the particle diameter, specific gravity and the addition amount of the inorganic fine particles, the coverage of the inorganic fine particles with respect to the surface area of the obtained hollow particles, is calculated by the following formula (A).

$$R = \{31/2/2\pi\} \times \{(D \times S)/(d \times s)\} \times n \quad \text{Formula (A)}$$

where "R" means the coverage (%) of the inorganic fine particles with respect to the surface area of the hollow particles; "D" means the volume average particle diameter (nm) of the hollow resin particles; "S" means the apparent density (g/cm$^3$) of the hollow resin particles; "d" means the primary particle diameter (nm) of the inorganic fine particles; "s" means the specific gravity of the inorganic fine particles; and "n" means the addition amount (parts by mass) of the inorganic fine particles.

As the material for the inorganic fine particles, examples include, but are not limited to, silica, calcium carbonate, alumina, titanium oxide, zinc oxide, tin oxide, calcium phosphate and cerium oxide. Among them, as the material for the inorganic fine particles, silica, calcium carbonate and alumina are preferable, and silica and calcium carbonate are more preferable.

These materials for the inorganic fine particles may be used alone or in combination of two or more kinds.

Even if the specific gravity of the inorganic fine particles is large, since the primary particle diameter and content of the inorganic fine particles are within the ranges described above, the hollow particles of the present disclosure can achieve both an improvement in dispersibility and weight reduction. The specific gravity of the inorganic fine particles is preferably from 1.5 to 4.5, more preferably from 1.8 to 3.5, and still more preferably from 2.0 to 2.5. As the material for the inorganic fine particles having a specific gravity of 2.0 or more and 2.5 or less, examples include silica. As the material for the inorganic fine particles having a specific gravity of more than 2.5 and 3.5 or less, examples include calcium carbonate. As the material for the inorganic fine particles having a specific gravity of more than 3.5, examples include titanium oxide and alumina. By using such inorganic fine particles as a coating agent, the dispersibility of the hollow particles can be enhanced.

(3) Hollow Particle

The hollow particles are formed by covering the surface of the hollow resin particles with the inorganic fine particles.

The volume average particle diameter of the hollow particles is generally from 0.1 μm to 9.0 μm, preferably from 0.2 μm to 8.0 μm, more preferably from 0.4 μm to 6.0 μm, still more preferably from 0.6 μm to 5.0 μm, and particularly preferably from 0.8 μm to 4.0 μm.

When the volume average particle diameter of the hollow particles is 0.1 μm or more, the cohesiveness between the hollow particles becomes small, so that the hollow particles can exhibit excellent dispersibility. When the volume average particle diameter of the hollow particles is 9.0 μm or less, the hollow particles are less likely to collapse, so that the hollow particles obtain high mechanical strength. Therefore, the hollow particles less likely to cause collapse or deformation when a load is applied under high temperature conditions, and the hollow particles can exhibit excellent heat resistance. Especially, the volume average particle diameter of the hollow particles is preferably 2.0 μm or more, and more preferably 2.5 μm or more, from the viewpoint of enhancing dispersibility.

The particle size distribution (the volume average particle diameter (Dv)/the number average particle diameter (Dn)) of the hollow particles may be from 1.1 to 2.5, may be from 1.1 to 2.3, and may be from 1.1 to 2.0. When the particle size distribution is 2.5 or less, the particles obtain small variation in compressive strength and heat resistance between the particles. Further, when the particle size distribution is 2.5 or less, for example, in the production of a product such as a sheet described later, a product having uniform thickness can be produced.

The volume average particle diameter (Dv) and number average particle diameter (Dn) of the hollow particles can be found as follows, for example: using a laser diffraction particle size distribution measuring apparatus, the particle diameter of the hollow particles is measured; the number average and volume average of them are calculated; and the obtained values can be determined as the number average particle diameter (Dn) and volume average particle diameter (Dv) of the particles, respectively. The particle size distribution is determined as the value found by dividing the volume average particle diameter by the number average particle diameter.

Since the hollow particles of the present disclosure are particles obtained by covering the surface of the hollow resin particles with the inorganic fine particles, the effect of the inorganic fine particles on the volume average particle diameter (Dv), number-average particle diameter (Dn) and particle size distributions of the hollow particles, is small. Therefore, these physical property values measured by using the hollow resin particles before being covered with the inorganic fine particles, may be regarded as the values of the hollow particles.

From the viewpoint of excellent dispersibility, the ratio of the volume average particle diameter of the hollow particles to the primary particle diameter of the inorganic fine particles (the volume average particle diameter of the hollow particles/the primary particle diameter of the inorganic fine particles) is preferably 10 or more, more preferably 20 or more, and still more preferably 30 or more. The upper limit of the ratio is not particularly limited. It is generally 900 or less. It may be 700 or less, or it may be 500 or less.

The void ratio of the hollow particles is generally from 55% to 95%, preferably from 58% to 93%, and more preferably from 60% to 90%. When the void ratio of the hollow particles is 55% or more, since the ratio of the hollow portion with respect to the hollow particles is high, the hollow particles have excellent heat resistance and heat insulating properties. When the void ratio of the hollow particles is 95% or less, the hollow particles have high strength.

In the hollow particles of the present disclosure, since the effect of the surface-covering inorganic fine particles on the void ratio of the whole hollow particles is small, the void ratio obtained by using the hollow resin particles before being covered with the inorganic fine particles, may be regarded as the void ratio of the hollow particles.

The void ratio of the hollow particles is calculated from the apparent density $D_1$ and true density $D_0$ of the hollow particles. As described above, in the hollow particles of the present disclosure, since the effect of the inorganic fine particles on the void ratio of the hollow particles is small, the following measuring and calculating methods may be applied to the hollow resin particles, and the thus-obtained apparent density $D_1$, true density $D_0$ and void ratio of the obtained hollow resin particles may be regarded as the apparent density $D_1$, true density Do and void ratio of the hollow particles.

The method for measuring the apparent density $D_1$ of the hollow particles is as follows. First, approximately 30 cm³ of the hollow particles are introduced into a measuring flask with a volume of 100 cm³, and the mass of the introduced hollow particles is precisely weighed. Next, the measuring flask in which the hollow particles are introduced, is precisely filled with isopropanol up to the marked line of the flask, while care is taken so that air bubbles do not get in. The mass of the isopropanol added to the measuring flask is precisely weighed, and the apparent density $D_1$ (g/cm³) of the hollow particles is calculated by the following formula (I).

Apparent density $D_1$=[Mass of the hollow particles]/ (100-[Mass of the isopropanol]/[Specific gravity of the isopropanol at the measuring temperature])      Formula (I)

The apparent density $D_1$ is equivalent to the specific gravity of the whole hollow particles in the case where the hollow portion is regarded as a part of each hollow particle.

The method for measuring the true density Dc. of the hollow particle is as follows. The hollow particles are pulverized in advance. Then, approximately 10 g of the pulverized hollow particles are introduced into a measuring flask with a volume of 100 cm³, and the mass of the introduced pulverized particles is precisely weighed. Then, similarly to the measurement of the apparent density, isopropanol is added to the measuring flask; the mass of the isopropanol is precisely weighed; and the true density $D_0$ (g/cm³) of the hollow particles is calculated by the following formula (II).

True density $D_0$=[Mass of the pulverized hollow particles]/(100-[Mass of the isopropanol]/[Specific gravity of the isopropanol at the measuring temperature])      Formula (II)

The true density Do is equivalent to the specific gravity of the shell portion alone of the hollow particles. As is clear from the above-mentioned measurement method, in the calculation of the true density Du, the hollow portion is not regarded as a part of each hollow particle.

The void ratio (%) of the hollow particles is calculated by the following formula (III), using the apparent density $D_1$ and true density $D_0$ of the hollow particles.

Void ratio (%)=100−(Apparent density $D_1$/True density $D_0$)×100      Formula (III)

The void ratio of the hollow particles can be reworded as the ratio of the hollow portion in the specific gravity of the hollow particles.

The method for evaluating the dispersibility of the hollow particles, is as follows.

First, the hollow particles are added to ion-exchanged water containing 1% of sodium dodecyl sulfate so that the concentration of the hollow particles is 5% by mass. The thus-obtained dispersion is subjected to a dispersion treatment for 30 minutes with a high-speed dispersing machine (for example, product name: HCMD DISPER 2.5 TYPE, manufactured by PRIMIX Corporation). Then, the volume-based particle size distribution of the hollow particles in the dispersion is measured. The evaluation criteria for dispersibility are as follows.

A: In the dispersion, the amount of aggregates having a size of 50 μm or more is less than 0.5% by volume.

B: In the dispersion, the amount of aggregates having a size of 50 μm or more is 0.5% by volume or more and 5% by volume or less.

F: In the dispersion, the amount of aggregates having a size of 50 μm or more is more than 5% by volume.

The method for evaluating the heat resistance of the hollow particles is as follows.

First, the apparent density $D_2$ of the hollow particles before heating is calculated by the following formula (B).

$$D_2=(100+n)/\{(100/S)+(n/s)\}$$      Formula (B)

where "$D_2$" means the apparent density (g/cm³) of the hollow particles before heating; "S" means the apparent density (g/cm³) of the hollow resin particles; "n" means the addition amount (parts by mass) of the inorganic fine particles; and "s" means the specific gravity of the inorganic fine particles.

Next, the hollow particles are heated as follows. First, 1 g of the hollow particles are added to a tablet forming jig having an inner diameter of 25 mm. While a load of 100 g is applied to the jig, the jig is kept at 200° C. for 3 hours. The jig is returned to room temperature; the hollow particles are taken out from the jig; and the apparent density $D_3$ of the hollow particles after heating, is measured by the same method as the above-mentioned apparent density $D_1$.

The increase rate r (%) of the apparent density is calculated by the following formula (C).

$$r=100-100\times\{(D_3-D_2)/D_2\}$$      Formula (C)

where "r" means the increase rate (%) of the apparent density; "$D_2$" means the apparent density (g/cm³) of the hollow particles before heating; and "Dr" means the apparent density (g/cm³) of the hollow particles after heating.

The evaluation criteria for heat resistance are as follows.

A: The increase rate r of the apparent density is less than 5%.

B: The increase rate r of the apparent density is 5% or more and 10% or less.

F: The increase rate r of the apparent density is more than 10%.

Examples of the intended application of the hollow particles include an under-coating material for thermal paper. In general, an under-coating material is required to have heat insulating properties and shock-absorbing properties (cushioning properties). In addition, it is required to have heat resistance which is required of the application of thermal paper. The hollow particles of the present disclosure can meet the requirements by virtue of the high void ratio, specific volume average particle diameter, hard-to-crush hollow shape and high heat resistance thereof.

Further, the hollow particles are useful as, for example, a plastic pigment that is excellent in gloss, masking power, etc. The hollow particles obtained by enclosing a useful component (such as a fragrance, a medicine, an agricultural chemical and an ink component) in the interior by means of an immersion treatment, a depressurized or pressurized immersion treatment or the like, can be used for various applications in accordance with the component contained in the interior.

As the intended application of the hollow particles, examples include, but are not limited to, applications for thermosensitive recording materials, fillers, scattering agents, coating materials and insulating materials.

2. Method for Producing Hollow Resin Particles

The method for producing hollow particles of the present disclosure comprises a step comprising obtaining the hollow resin particles by, without expanding a hollow resin particle precursor containing an organic solvent, removing the organic solvent from the hollow resin particle precursor.

The method for producing the hollow particles is not particularly limited, as long as the hollow particles that satisfy the above-mentioned conditions of the volume average particle diameter, the void ratio, the content of the crosslinkable monomer unit, and the primary particle diameter and content of the inorganic fine particles, can be produced by the method. Hereinbelow, an embodiment of the method for producing the hollow particles is described. However, the method for producing the hollow particles of the present disclosure is not limited to the following embodiment.

An embodiment of the method for producing the hollow resin particles includes:

a step comprising preparing a mixture liquid which contains a non-crosslinkable monomer, a crosslinkable monomer, an oil-soluble polymerization initiator, an organic solvent, a suspension stabilizer and an aqueous medium, and in which the content of the crosslinkable monomer is from 25 parts by mass to 100 parts by mass with respect to the total content (100 parts by mass) of the non-crosslinkable monomer and the crosslinkable monomer (a mixture liquid preparation step);

a step comprising, by suspending the mixture liquid, preparing a suspension in which monomer droplets containing the organic solvent are dispersed in the aqueous medium (a suspension preparation step);

a step comprising, by a polymerization reaction of the suspension, preparing a precursor composition containing a hollow resin particle precursor having a hollow portion in which the organic solvent is included (a polymerization step);

a step comprising obtaining hollow resin particles by removing the organic solvent included in the hollow resin particle precursor, without expanding the hollow resin particle precursor including the organic solvent (a solvent removal step); and a step comprising adding the inorganic fine particles on the surface of the hollow resin particles (an addition step).

The disclosed embodiment includes, as described above, (1) the mixture liquid preparation step, (2) the suspension preparation step, (3) the polymerization step, (4) the solvent removal step, and (5) the addition step. The steps of the disclosed embodiment are not limited to these five steps.

FIG. 1 is a schematic diagram showing an example of the first production method of the present disclosure. Diagrams (1) to (5) shown in FIG. 1 correspond to the steps (1) to (5), respectively. White arrows shown between the drawings indicate the order of the steps. FIG. 1 is merely a schematic diagram for description, and the production method of the present disclosure is not limited to the method shown in FIG. 1. Further, the structures, dimensions and shapes of the materials used in the production method of the present disclosure are not limited to the structures, dimensions and shapes of various materials shown in FIG. 1.

The diagram (1) of FIG. 1 is a schematic cross-sectional diagram showing an embodiment of the mixture liquid prepared in the mixture liquid preparation step. As shown in the diagram, the mixture liquid contains an aqueous medium 1 and a low polarity material 2 dispersed in the aqueous medium 1. The low polarity material 2 means a material such as an organic solvent, which has relatively low polarity and which is less likely to mix with the aqueous medium 1.

The diagram (2) of FIG. 1 is a schematic cross-sectional diagram showing an embodiment of the suspension prepared in the suspension preparation step. The suspension contains the aqueous medium 1 and a micelle 10 (monomer droplets) dispersed in the aqueous medium 1. The micelle 10 is formed by surrounding an oil-soluble monomer composition 4 (containing an oil-soluble polymerization initiator 5, etc.) with a suspension stabilizer 3 (such as a surfactant).

The diagram (3) of FIG. 1 is a schematic cross-sectional diagram showing an embodiment of the precursor composition after the polymerization step. The precursor composition contains the aqueous medium 1 and a hollow resin particle precursor 20 dispersed in the aqueous medium 1. A shell 6 is located on the outside of the hollow resin particle precursor 20, which is formed by polymerization of the monomer and so on contained in the micelle 10. A hollow portion is present in the interior of the shell 6, and it includes an organic solvent 7.

The diagram (4) of FIG. 1 is a schematic cross-sectional diagram showing an embodiment of the hollow resin particle precursor after the solvent removal step. The diagram (4) of FIG. 1 shows a state where the aqueous medium 1 is separated from the state shown in the diagram (3) of FIG. 1, and the organic solvent 7 is removed. As a result, a hollow resin particle 30 is obtained, which has a hollow portion 8 in the interior of the shell 6.

The diagram (5) of FIG. 1 is a schematic cross-sectional diagram showing an embodiment of the hollow particle after the addition step. The diagram (5) of FIG. 1 shows a state where inorganic fine particles 9 are added on the surface of the hollow resin particle 30. As a result, a hollow particle 100 is obtained, in which the surface of the hollow resin particle is covered with the inorganic fine particles.

Hereinbelow, the embodiments of the five steps mentioned above and other steps are described in order. The hollow particles of the present disclosure are not limited to the particles produced through the following embodiments.

(1) Mixture Liquid Preparation Step

The mixture liquid preparation step is a step comprising preparing the mixture liquid containing (A) the non-crosslinkable monomer, (B) the crosslinkable monomer, (C) the oil-soluble polymerization initiator, (E) the organic solvent, (F) the suspension stabilizer and (F) the aqueous medium.

(A) Non-Crosslinkable Monomer

The non-crosslinkable monomer is as described above. As the non-crosslinkable monomer, a monovinyl monomer may be used alone; a hydrophilic monomer may be used alone; or a monovinyl monomer and a hydrophilic monomer may be used in combination.

In the present disclosure, one or two or more monovinyl monomers and one or two or more hydrophilic monomers may be used in combination. The reason is as follows.

Figure 3A:
FIG. 3A is a schematic diagram of a conventional core resin particle.
Figure 3B:
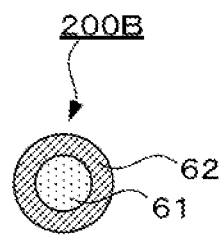
FIG. 3B is a schematic cross-sectional diagram of a conventional core-shell resin particle.
Figure 3C:
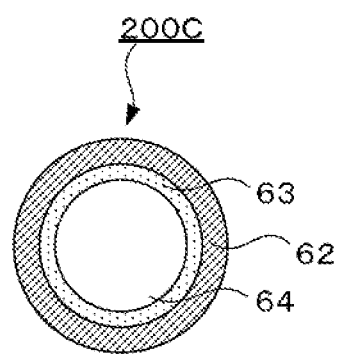
FIG. 3C is a schematic cross-sectional diagram of a conventional hollow resin particle.

FIGS. 3A to 3C show the steps of a conventional hollow resin particle production process. FIG. 3A is a schematic diagram of a core resin particle 61. FIG. 3B is a schematic cross-sectional diagram of a core-shell resin particle 200B. FIG. 3C is a schematic cross-sectional diagram of a hollow-resin particle 200C.

Conventionally, the core resin particle 61 is formed, in which an alkali-swelling material is contained in the interior (FIG. 3A), and a shell 62 is formed on the outside of the core resin particle 61 (FIG. 3B). By utilizing the swelling of the core resin particle 61 caused by adding a base, a three-layered hollow resin particle 200C including a hollow portion 64, a hollow core 63 and the shell 62 is produced (FIG. 3C). However, the void ratio of the hollow resin particles produced by this method is 55% or less and low.

In the present disclosure, the shell of the hollow resin particles is easily swollen by using the monovinyl monomer and the hydrophilic monomer in combination. Thus, the organic solvent can be easily removed, and the void ratio of the obtained hollow resin particles can be increased higher than ever before.

When the total mass of the materials (A) to (E) is determined as 100% by mass, the mass ratio of (A) the non-crosslinkable monomer is preferably from 5% by mass to 50% by mass, and more preferably from 10% by mass to 40% by mass. Since the mass ratio of (A) the non-crosslinkable monomer is from 5% by mass to 50% by mass, the mechanical properties of the obtained hollow resin particles can be enhanced higher than ever before, to such a degree that the hollow of the hollow resin particles can be maintained; moreover, the void ratio of the hollow resin particles can be increased higher than ever before.

(B) Crosslinkable Monomer

The crosslinkable monomer is as described above.

With respect to the total mass (100 parts by mass) of (A) the non-crosslinkable monomer and (B) the crosslinkable monomer, the content of (B) the crosslinkable monomer is preferably from 25 parts by mass to 100 parts by mass, more preferably from 30 parts by mass to 95 parts by mass, still more preferably from 32 parts by mass to 90 parts by mass, and particularly preferably from 35 parts by mass to 85 parts by mass. When the content of (B) the crosslinkable monomer is from 25 parts by mass to 100 parts by mass, there is no possibility that the obtained hollow resin particles are dented, so that the void ratio of the hollow resin particles can be maintained at a high level, and large amounts of the organic solvent is less likely to remain in the hollow resin particles.

(C) Oil-Soluble Polymerization Initiator

In the present disclosure, instead of an emulsion polymerization method using a water-soluble polymerization initiator, a suspension polymerization method using an oil-soluble polymerization initiator is employed. The advantage of employing the suspension polymerization method will be described in detail in "(2) Suspension preparation step".

The oil-soluble polymerization initiator is not particularly limited, as long as it is a lipophilic polymerization initiator having a water solubility of 0.2% by mass or less. Examples of the oil-soluble polymerization initiator include benzoyl peroxide, lauroyl peroxide, t-butyl peroxy-2-ethylhexanoate, 2,2'-azobis(2,4-dimethylvaleronitrile) and azobis(isobutyronitrile).

With respect to the total mass (100 parts by mass) of (A) the non-crosslinkable monomer and (B) the crosslinkable monomer, the content of (C) the oil-soluble polymerization initiator is preferably from 0.1 parts by mass to 10 parts by mass, more preferably from 0.5 parts by mass to 7 parts by mass, and still more preferably from 1 part by mass to 5 parts by mass. Since the content of the oil-soluble polymerization initiator is from 0.1 parts by mass to 10 parts by mass, polymerization reaction is sufficiently developed; the oil-soluble polymerization initiator is less likely to be left after the polymerization reaction; and an unexpected side reaction is less likely to progress.

(D) Organic Solvent

In the present disclosure, the organic solvent functions to form the hollow portion in the interior of the particles.

In the suspension preparation step described later, the suspension in which the monomer droplets containing the organic solvent are dispersed in the aqueous medium, is obtained. In the suspension preparation step, phase separation occurs in the monomer droplets. As a result, the organic solvent with relatively low polarity is likely to gather in the interior of the monomer droplets. Finally, the organic solvent is likely to be distributed in the interior of the monomer droplets, and materials other than the organic solvent are likely to be distributed at the periphery of the monomer droplets, in accordance with the polarities thereof.

Then, in the polymerization step described later, the precursor composition containing the hollow resin particle precursor including the organic solvent, is obtained. That is, since the organic solvent gathers in the interior of the particles, the hollow portion made of the organic solvent is formed in the interior of the obtained hollow resin particle precursor.

The type of the organic solvent is not particularly limited. Examples of the organic solvent include carbon disulfide, carbon tetrachloride and a hydrocarbon solvent such as benzene, toluene, xylene, butane, pentane, hexane and cyclohexane, which is a solvent with relatively high volatility.

The relative permittivity at 20° C. of the organic solvent used in the present disclosure is preferably 3 or less. The relative permittivity is an index of the level of the polarity of the compound. In the case where the relative permittivity of the organic solvent is 3 or less and sufficiently small, it is presumed that phase separation rapidly progresses in the monomer droplets, and the hollow is easily formed.

Examples of the solvent having a relative permittivity at 20° C. of 3 or less, are as follows. Relative permittivity values are shown inside the parentheses.

Heptane (1.9), cyclohexane (2.0), benzene (2.3) and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method for measuring the relative permittivity at 20° C., include a relative permittivity test which is in conformity with 23 of JIS C 2101:1999 and which is carried out at a measuring temperature set to 20° C.

The organic solvent used in the present disclosure may be a hydrocarbon compound having 5 to 7 carbon atoms. The hydrocarbon compound having 5 to 7 carbon atoms is easily included into the precursor particles during the polymerization step, and it can be easily removed from the interior of the precursor particles during the solvent removal step. The organic solvent is preferably a hydrocarbon compound having 6 carbon atoms.

With respect to the total mass (100 parts by mass) of (A) the crosslinkable monomer and (B) the crosslinkable monomer, the content of (D) the organic solvent is preferably from 100 parts by mass to 900 parts by mass, more preferably from 150 parts by mass to 700 parts by mass, and still more preferably from 200 parts by mass to 500 parts by mass. Since the content of (D) the organic solvent is from 100 parts by mass to 900 parts by mass, the void ratio of the obtained hollow resin particles is increased higher than ever before, and the mechanical properties of the hollow resin particles can be enhanced to such a degree that the hollow can be maintained.

(E) Suspension Stabilizer

The suspension stabilizer is an agent that stabilizes the suspension state of the suspension in the suspension polymerization method described later.

The suspension stabilizer may contain a surfactant. The surfactant is a material that forms a micelle including at least one monomer selected from the group consisting of a monovinyl monomer and a hydrophilic monomer, a crosslinkable monomer, an oil-soluble polymerization initiator, fatty oil and an organic solvent, in the suspension polymerization method described later.

As the surfactant, any of a cationic surfactant, an anionic surfactant and a nonionic surfactant may be used, or they may be used in combination. Among them, an anionic surfactant and a nonionic surfactant are preferable, and an anionic surfactant is more preferable.

Examples of the anionic surfactant include sodium dodecylbenzen sulfonate, sodium lauryl sulfate, dialkyl sodium sulfosuccinate and formalin condensate salt of naphthalene sulfonate.

Examples of the nonionic surfactant include polyoxyethylene alkyl ether, polyoxyethylene alkyl ester and polyoxyethylene sorbitan alkyl ester.

Examples of the cationic surfactant include didecyl dimethyl ammonium chloride and stearyl trimethyl ammonium chloride.

The suspension stabilizer may contain a hardly water-soluble inorganic compound, a water-soluble high molecule, etc.

With respect to the total mass (100 parts by mass) of (A) the non-crosslinkable monomer, (B) the crosslinkable monomer, (C) the oil-soluble polymerization initiator and (D) the organic solvent, the content of (E) the suspension stabilizer is preferably from 0.1 parts by mass to 3 parts by mass, more preferably from 0.2 parts by mass to 2 parts by mass, and still more preferably from 0.3 parts by mass to 1 part by mass. When the content of (E) the suspension stabilizer is 0.1 parts by mass or more, a micelle is easily formed in the aqueous medium. When the content of (E) the suspension stabilizer is 3 parts by mass or less, a reduction in productivity which is caused by increasing in blowing in the solvent removal step is less likely to occur.

(F) Aqueous Medium

In the present disclosure, the aqueous medium means a medium selected from the group consisting of water, a hydrophilic solvent, and a mixture of water and a hydrophilic solvent.

In the present disclosure, the hydrophilic solvent is not particularly limited, as long as it is a solvent which can mix well with water and which does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the monomer droplets, it is important that the polarity of the entire mixture is not too low. In this case, the mixing ratio (mass ratio) of water to the hydrophilic solvent may be from 99:1 to 50:50.

(G) Others

The mixture liquid prepared in the mixture liquid preparation step is a composition in a state where the materials (A) to (F) are simply mixed and, for example, appropriately stirred. In the mixture liquid, an oil phase containing the materials (A) to (D) is dispersed in the aqueous medium, and the size of the dispersed oil phase is a particle diameter of approximately several millimeters. The dispersion state of the materials in the mixture liquid can be observed with the naked eye, depending on the types of the materials.

The mixture liquid preparation step may be a step comprising mixing the oil phase containing (A) the non-crosslinkable monomer, (B) the crosslinkable monomer, (C) the oil-soluble polymerization initiator and (D) the organic solvent with the aqueous phase containing (E) the suspension stabilizer and (F) the aqueous medium. As just described, by preparing the oil phase and the aqueous phase separately and then mixing the phases, such hollow particles can be produced, that the composition of the shell portion is uniform.

(2) Suspension Preparation Step

This is a step comprising preparing the suspension in which the monomer droplets containing the organic solvent are dispersed in the aqueous medium, by suspending the mixture liquid.

The monomer droplets contain the materials (A) to (D) and have a particle diameter of approximately from 0.1 μm to 9 μm. In the suspension prepared in the present step, they are uniformly dispersed in the aqueous medium. It is difficult to observe such monomer droplets with the naked eye, and they can be observed with a known observation equipment such as an optical microscope.

As described above, in the disclosed embodiments, the suspension polymerization method is employed instead of the emulsion polymerization method. Hereinbelow, the advantage of using the suspension polymerization method and the oil-soluble polymerization initiator will be described in comparison to the emulsion polymerization method.

Figure 4:
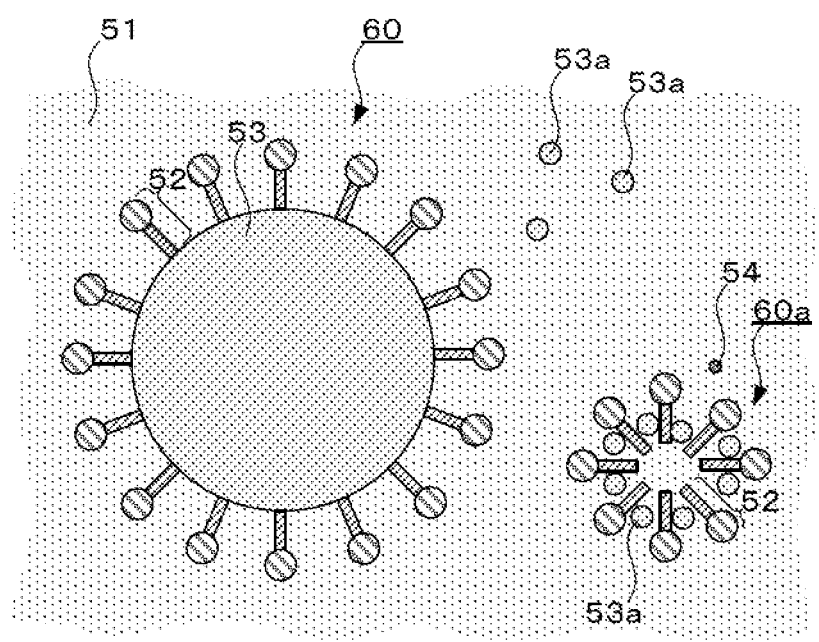
FIG. 4 is a schematic diagram showing a dispersion for conventional emulsion polymerization.

FIG. 4 is a schematic diagram showing a dispersion for emulsion polymerization. A micelle 60 shown in FIG. 4 schematically shows a cross section thereof.

FIG. 4 shows a state where the micelle 60, a micelle precursor 60a, a monomer 53a dissolved out in a solvent, and a water-soluble polymerization initiator 54 are dispersed in an aqueous medium 51. The micelle 60 is formed by surrounding an oil-soluble monomer composition 53 with a surfactant 52. The monomer composition 53 contains, for example, a monomer serving as a raw material for a polymer. However, it does not contain a polymerization initiator.

The micelle precursor 60a is an aggregate of the molecules of the surfactant 52. However, it does not contain a sufficient amount of the monomer composition 53 in the interior. The micelle precursor 60a grows into the micelle 60 by, for example, incorporating the monomer 53a dissolved out in the solvent into the interior of the micelle precursor, and procuring part of the monomer composition 53 from other micelles 60.

The water-soluble polymerization initiator 54 diffuses in the aqueous medium 51 and enters the interior of the micelle 60 and the micelle precursor 60a to promote the growth of oil droplets in the interior. Therefore, in the emulsion polymerization method, although the micelle 60 is monodispersed in the aqueous medium 51, the particle diameter of the micelle 60 is presumed to grow up to several hundred nanometers.

Figure 2:
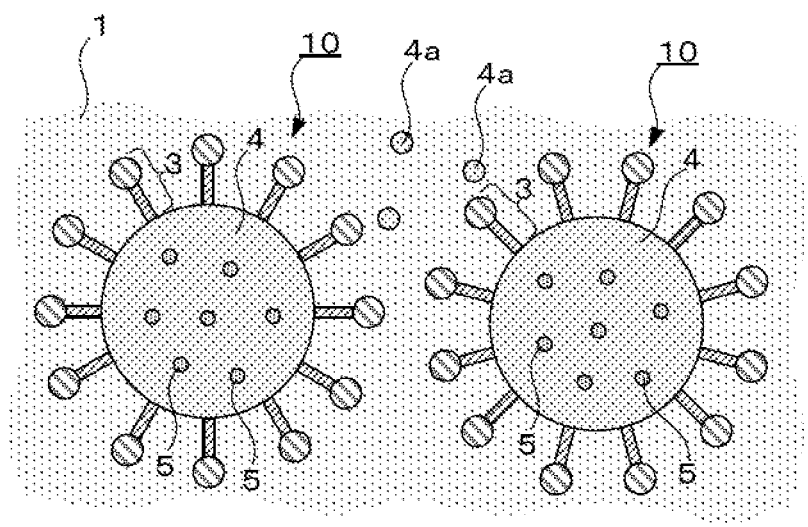
FIG. 2 is a schematic diagram showing an embodiment of a suspension in a suspension preparation step.

FIG. 2 is a schematic diagram showing an embodiment of the suspension in this step. Each micelle 10 shown in FIG. 2 schematically shows a cross section thereof. FIG. 2 is merely a schematic diagram, and the suspension of the present disclosure is not limited to the suspension shown in FIG. 2. A part of FIG. 2 corresponds to the diagram (2) of FIG. 1 described above.

FIG. 2 shows a state where the micelles 10 and the droplets of a monomer 4a (containing (A) the non-crosslinkable monomer and (B) the crosslinkable monomer) dispersed in an aqueous medium 1, are dispersed in the aqueous medium. The micelle 10 is formed by surrounding the oil-soluble monomer composition 4 with a surfactant 3. The monomer composition 4 contains the oil-soluble polymerization initiator 5, monomers (including (A) the non-crosslinkable monomer and (B) the crosslinkable monomer) and the organic solvent (they are not illustrated in FIG. 2). As shown in FIG. 2, in this step, minute oil droplets containing the monomer composition 4 are formed in the interior of the micelles 10 in advance, and then polymerization initiating radicals are generated in the minute oil droplets by the oil-soluble polymerization initiator 5. Therefore, precursor particles with a target particle diameter can be produced without excessively growing the minute oil droplets.

Further, as can be seen by comparing the suspension polymerization (FIG. 2) and the emulsion polymerization (FIG. 4), in the suspension polymerization (FIG. 2), the oil-soluble polymerization initiator 5 has no opportunity to come into contact with the monomer 4a dispersed in the aqueous medium 1. Thus, the generation of surplus polymer particles in addition to latex particles having a target hollow portion, can be prevented by using the oil-soluble polymerization initiator.

An embodiment of the suspension preparation step is described below.

The monomer droplets are formed by suspending the mixture liquid containing the materials (A) to (F). The method for forming the monomer droplets is not particularly limited. For example, the formation is carried out by using an apparatus capable of strong stirring, such as an (in-line type) emulsifying disperser (manufactured by Pacific Machinery & Engineering Co., Ltd.; product name: MILDER) and a high-speed emulsifying disperser (manufactured by PRIMIX Corporation; product name: T.K. HOMOMIXER MARK II TYPE). In this step, as described above, since phase separation occurs in the monomer droplets, the organic solvent with relatively low polarity is likely to gather in the interior of the monomer droplets. As a result, the organic solvent is distributed in the interior of the obtained monomer droplets, and materials other than the organic solvent are distributed at the periphery thereof.

Another embodiment of the suspension preparation step is described below.

First, the oil phase containing the materials (A) to (D) and the aqueous phase containing the material (E) and the aqueous medium are prepared. The oil phase is preferably prepared so that the content of (B) the crosslinkable monomer is from 25 parts by mass to 100 parts by mass, with respect to the total mass (100 parts by mass) of (A) the non-crosslinkable monomer and (B) the crosslinkable monomer.

Next, the suspension is prepared by a membrane emulsification method. The membrane emulsification method is a method for obtaining, by extruding a dispersion phase solution into a continuous phase through the pores of a porous membrane, a suspension in which minute droplets of the dispersion phase are dispersed in the continuous phase. The dispersion phase means a liquid phase dispersed in the form of minute droplets, and the continuous phase means a liquid phase surrounding the dispersion phase droplets. In the disclosed embodiments, both a direct membrane emulsification method and a membrane emulsification method involving preliminary emulsification, may be employed, as long as they are membrane emulsification methods in which the oil phase is made into the dispersion phase and the liquid phase is made into the continuous phase.

In the membrane emulsification method, a membrane emulsification system (such as MN-20 manufactured by SPG Technology Co., Ltd.) and a membrane having a specific pore diameter are used. As the porous membrane usable in the membrane emulsification method, examples include, but are not limited to, an inorganic porous membrane such as a shirasu porous glass membrane (an SPG membrane) and an organic porous membrane such as a PTFE (Polytetrafluoroethylene) membrane.

The pore diameter of the porous membrane used in the membrane emulsification method defines the diameter of the obtained minute droplets. Depending on the components in the dispersion phase, the selection of the pore diameter of the porous membrane is important, since the diameter of the minute droplets has an influence on the number average particle diameter of the obtained hollow resin particles. For example, in the case of using a shirasu porous glass membrane (an SPG membrane), the pore diameter of the membrane is preferably selected from 0.1 μm to 4.0 μm, more preferably selected from 0.2 μm to 3.5 μm, and still more preferably selected from 0.3 μm to 3.0 μm.

In the suspension preparation step by the membrane emulsification method, the suspension is prepared by performing the membrane emulsification in which the oil phase and the aqueous phase are made into the dispersion phase and the continuous phase, respectively, using the membrane emulsification system and the porous membrane.

The suspension preparation step is not limited to the two embodiments mentioned above.

(3) Polymerization Step

This is a step comprising preparing the precursor composition by polymerization reaction of the suspension, the precursor composition containing the hollow resin particle precursor having the hollow portion in which the organic solvent is included. The hollow resin particle precursor is in the form of particles formed mainly by copolymerization of (A) the non-crosslinkable monomer and (B) the crosslinkable monomer. The polymerization system is not particularly limited. For example, a batch system, a semicontinuous system or a continuous system may be employed. The polymerization temperature is preferably from 40° C. to 80° C., and more preferably from 50° C. to 70° C. The polymerization reaction time is preferably from 1 hour to 20 hours, and more preferably from 2 hours to 15 hours.

Since the monomer droplets containing the organic solvent in the interior is used, as described above, the hollow filled with the organic solvent is formed in the interior of the hollow resin particle precursor.

(4) Solvent Removal Step

This is a step comprising obtaining the hollow resin particles by removing the organic solvent included in the hollow resin particle precursor, without expanding the hollow resin particle precursor including the organic solvent. In the method for producing the hollow particles of the present disclosure, the hollow resin particle precursor having the hollow portion and including the organic solvent in the hollow portion, is obtained by the polymerization step. Then, in this step, the organic solvent is removed from the hollow portion without expanding the hollow resin particle precursor. Accordingly, such an effect is exerted, that the uniformity of the void ratio of the particles is excellent, and the amount of the particles that cannot maintain the hollow is reduced.

In this step, expanding the hollow resin particle precursor means increasing the particle diameter of the hollow resin particle precursor by softening the resin and swelling the hollow resin particle precursor by an internal pressure such as the vapor pressure of the organic solvent included therein.

In the case where the organic solvent included in the hollow resin particle precursor is removed in a slurry containing the aqueous medium, there is a problem that the obtained hollow resin particles collapse if the same volume of water as the organic solvent released from the interior of the hollow resin particle precursor do not enter the interior of the particles.

A possible method for avoiding this problem is the following embodiment. First, the pH of the precursor composition is set to 7 or more. Next, the shell of the hollow resin particle precursor is alkali-swelled. Then, the organic solvent is removed. In this embodiment, since the shell of the hollow resin particle precursor obtains flexibility, replacement of the organic solvent in the interior of the hollow resin particle precursor with water progresses rapidly, and the hollow resin particle precursor including water is obtained. Then, the hollow resin particle precursor including water is separated and dried to remove the water from the interior of the particles, thereby obtaining the hollow resin particles in which gas occupies the hollow portion.

Another embodiment of the solvent removal step is described below.

First, the hollow resin particle precursor is obtained by solid-liquid separation of the precursor composition. Next, the organic solvent included in the hollow resin particle precursor is removed in a gaseous atmosphere, thereby obtaining hollow resin particles.

The method for solid-liquid separation of the precursor composition is not particularly limited, as long as it is a method by which the solid component containing the hollow resin particle precursor and the liquid component containing the aqueous medium are separated without removing the organic solvent included in the hollow resin particle precursor. As the solid-liquid separation method, known methods may be used. Examples of the solid-liquid separation method include the centrifugation method, the filtration method, and still-standing separation. Among them, the centrifugation method or the filtration method may be employed, and the centrifugation method may be employed from the viewpoint of simplicity of operation.

Preliminary drying may be carried out after the solid-liquid separation and before the removal of the organic solvent from the hollow resin particle precursor in the gaseous atmosphere. Examples of the preliminary drying include preliminary drying the solid component obtained after the solid-liquid separation, by a drying apparatus (such as a dryer) or a drying appliance (such as a hand dryer).

In this step, the term "in a gaseous atmosphere" means, in a strict sense, being in an environment where no liquid component exists outside the hollow resin particle precursor, and being in an environment where a very small amount of liquid component exists outside the hollow resin particle precursor, which is at a level that has not influence on the removal of the organic solvent. The term "in a gaseous atmosphere" can be reworded as a state where the hollow resin particle precursor is separated from the slurry, or it can be reworded as a state where the hollow resin particle precursor exists in a dry powder.

As shown in Production Examples 1 to 4 described later, the fact that the hollow resin particles subjected to vacuum drying and then returned to normal pressure maintains a spherical shape, is considered to be evidence that the gas transmissivity of the shell itself is relatively high.

It is generally known that the gas transmissivity of nylon, ethylene vinyl alcohol (EVOH) and the like is increased in high humidity. It is understood that this is because these polymers are plasticized by water molecules and results in an increase in the mobility of the polymers. However, since the hollow resin particles of the present disclosure are considered to have a high degree of crosslinking, the influence of the plasticization due to the action of the aqueous medium, is presumed to be small. Thus, in the present disclosure, the fact that the shell of the hollow resin particles has gas transmissivity, is considered to be due to the properties peculiar to the polymer contained in the shell.

The method for removing the organic solvent in the hollow resin particle precursor in the gaseous atmosphere, is not particularly limited, and known methods may be employed. Examples of the known methods include the reduced pressure drying method, the heat drying method, the flash drying method, and a combination of these methods.

In particular, in the case of using the heat drying method, the heating temperature needs to be more than or equal to the boiling point of the organic solvent and less than or equal to the highest temperature at which the shell structure of the obtained hollow resin particles does not collapse. Therefore, depending on the composition of the shell of the hollow resin particle precursor and the type of the organic solvent, for example, the heating temperature may be from 40° C. to 200° C., may be from 50° C. to 150° C., may be from 60° C. to 130° C., or may be from 70° C. to 100° C.

The organic solvent in the interior of the hollow resin particle precursor is replaced with gas in the outside by the drying operation in the gaseous atmosphere. As a result, hollow resin particles in which the gas occupies the hollow portion, are obtained.

The drying atmosphere is not particularly limited, and it may be appropriately selected depending on the intended application of the hollow resin particles. Examples of the drying atmosphere include air, oxygen, nitrogen and argon. It may be heat-dried under a vacuum condition. When the organic solvent in the hollow resin particle precursor is removed by drying under a vacuum condition, hollow resin particles in which the interior is vacuum, are primarily obtained. Further, hollow resin particles in which the interior is temporarily vacuum, are obtained by filling the interior of the hollow resin particles with gas once and then drying the particles under reduced pressure.

Another possible step is a step comprising replacing the gas in the interior of the hollow resin particles with other gas or liquid. By such replacement, the environment of the interior of the hollow resin particles can be changed; molecules can be selectively confined in the interior of the hollow resin particles; or the chemical structure of the interior of the hollow resin particles can be modified in accordance with the intended application.

(5) Addition Step

This is a step comprising adding the inorganic fine particles on the surface of the hollow resin particles. The addition method is not particularly limited, and conventionally known methods can be employed.

An embodiment of the addition step is as follows. First, the hollow resin particles are appropriately dispersed in the dispersion medium. Next, the inorganic fine particles are added into the obtained dispersion. They are mixed by stirring for from 10 minutes to 5 hours. Then, the mixture is filtered. By appropriately drying a solid component thus obtained, the hollow particles of the present disclosure are obtained.

The type and addition amount of the inorganic fine particles are as described above.

To add the inorganic fine particles on the surface of the hollow resin particles, a mixer may be used. The mixer is not particularly limited, as long as it can add the inorganic fine particles on the surface of the hollow resin particles. Examples of the mixer include HOMODISPER (: product name, manufactured by PRIMIX Corporation), MILDER (: product name, manufactured by Pacific Machinery & Engineering Co., Ltd.), CAVITRON (: product name, manufactured by Pacific Machinery & Engineering Co., Ltd.), FM MIXER (: product name, manufactured by Nippon Coke & Engineering Co., Ltd.), SUPER MIXER (: product name, manufactured by Kawata Manufacturing Co., Ltd.), Q MIXER (: product name, manufactured by Nippon Coke & Engineering Co., Ltd.), MECHANOFUSION SYSTEM (: product name, manufactured by Hosokawa Micron Corporation) and MECHANOMILL (: product name, manufactured by Okada Seiko Co., Ltd.)

3. Aqueous Dispersion

The aqueous dispersion of the present disclosure contains the hollow particles.

Since the hollow particles are covered with the inorganic fine particles, the cohesiveness between the hollow particles is low. Therefore, when the aqueous dispersion of the present disclosure is used in a coating material described later or the like, the hollow particles can be uniformly applied on a coated surface, and a layer or film which uniformly contains the hollow particles, can be easily formed on the coated surface.

The aqueous dispersion of the present disclosure may be composed of only the hollow particles and water, or it may further contain other materials such as a binder and a surfactant.

The applications of the aqueous dispersion of the present disclosure relate to the above-described applications of the hollow particles. Examples of the applications of the aqueous dispersion of the present disclosure include, but are not limited to, an aqueous coating material, more specifically, a coating material for thermal paper When the aqueous dispersion is used as a coating material for thermal paper, the specific usage and effects thereof are as follows.

A thermal paper usually has a structure in which a color developing layer is provided on one surface of a substrate. The aqueous dispersion of the present disclosure can be used to form an intermediate layer between the substrate and the color developing layer. For example, a thermal paper having a three-layered structure (the color developing layer/the intermediate layer/the substrate) is obtained by applying the coating material for thermal paper on one surface of the substrate, drying the applied coating material to form the intermediate layer, and then further forming the color developing layer on the surface of the intermediate layer.

In the thermal paper having the three-layered structure, the intermediate layer exhibits a heat insulating effect and a buffering effect. The thermal paper develops color by applying heat from a thermal head to the color developing layer. At this time, since the intermediate layer exhibits the heat insulating effect derived from the hollow particles, heat does not escape from the color developing layer to the substrate. As a result, efficient color development can be achieved. In addition, since the intermediate layer exhibits the buffering effect (a cushioning action) derived from hollow particles, the adhesion between the thermal head and the thermal paper can be increased.

By providing such an intermediate layer, the color developing layer obtains better resolution, so that printing can be carried out more precisely than ever before. Therefore, the aqueous dispersion of the present disclosure can be used as an aqueous coating material which is particularly suitable for producing high-quality thermal paper.

EXAMPLES

Hereinbelow, the present invention will be described in more detail, using examples and comparative examples. However, the present invention is not limited to the following examples. In the following description, "part(s)" and "%" are on a mass basis unless otherwise specified.

The test methods employed in the following examples and comparative examples are as follows.

1 Production of Hollow Resin Particles

Production Example 1

(1) Mixture Liquid Preparation Step

First, the following materials (a1) to (d1) were mixed. The obtained mixture was used as an oil phase.

(a1) Methacrylic acid: 40 parts
(b1) Ethylene glycol dimethacrylate: 60 parts
(c1) 2,2'-Azobis(2,4-dimethylvaleronitrile) (an oil-soluble polymerization initiator manufactured by Wako Pure Chemical Industries, Ltd., product name: V-65): 3 parts
(d1) Cyclohexane: 270 parts Next, 4 parts of (e) a surfactant was added to 800 parts of (f) ion-exchanged water. The obtained mixture was used as an aqueous phase.

The aqueous phase and the oil phase were mixed, thereby preparing a mixture liquid.

(2) Suspension Preparation Step

The mixture liquid was suspended by stirring with an in-line type emulsifying disperser. Thus, a suspension was prepared, in which monomer droplets including cyclohexane were dispersed in water.

(3) Polymerization Step

The suspension was stirred in a nitrogen atmosphere at 65° C. for 4 hours to complete polymerization reaction. By this polymerization reaction, a precursor composition containing a hollow resin particle precursor including cyclohexane, was prepared.

(4) Solvent Removal Step

The obtained precursor composition was filtered. The obtained solid component was dried with a dryer at a temperature of 40° C., thereby obtaining a hollow resin particle precursor including cyclohexane.

The hollow resin particle precursor was heat-dried with a vacuum dryer at 200° C. for 6 hours under a vacuum condition. Then, the vacuum condition was changed to a normal pressure condition by nitrogen, and the precursor was cooled to room temperature, thereby obtaining the particles of Example 1. From the scanning electron microscopy result and void ratio value of the particles, the particles were confirmed to be in a spherical shape and to have a hollow portion.

Production Examples 2 and 3

Particles were obtained by a similar production method to Production Example 1, except that the materials and addition amounts shown in Table 1 were employed in "(1) Mixture liquid preparation step". From the scanning electron microscopy result and void ratio value of the particles, the particles were confirmed to be in a spherical shape and to have a hollow portion.

Production Example 4

The particles of Production Example 4 were obtained by a similar production method to Production Example 1, except the following: the materials and addition amounts shown in Table 1 were employed in "(1) Mixture liquid preparation step"; the aqueous phase and the oil phase were supplied to the next "(2) Suspension preparation step" without mixing them; and in "(2) Suspension preparation step", a suspension was prepared by, instead of the suspension method using the in-line type emulsifying disperser, membrane emulsification in which the oil phase and the aqueous phase were made into a dispersion phase and a continuous phase, respectively, using a membrane emulsification system and a shirasu porous glass membrane having a pore diameter of 3 μm. From the scanning electron microscopy result and void ratio value of the particles, the particles were confirmed to be in a spherical shape and to have only one hollow portion.

Comparative Production Example 1

The particles of Comparative Production Example 1 were obtained by a similar production method to Production Example 1, except that the materials and addition amounts shown in Table 1 were employed in "(1) Mixture liquid preparation step". From the scanning electron microscopy result and void ratio value of the particles, the particles were confirmed to be in a spherical shape and to have a hollow portion.

Comparative Production Example 2

The particles of Comparative Production Example 2 were obtained by a similar production method to Production Example 4, except that the materials and addition amounts shown in Table 1 were employed in "(1) Mixture liquid preparation step".

2. Measurement and Evaluation of Particles

The following measurement and evaluation were carried out on the particles of Production Examples 1 to 4 and Comparative Production Examples 1 and 2. Details are as follows.

(1) Measurement of Volume Average Particle Diameter of Particles

The particle diameter of each particle was measured by using a laser diffraction particle size distribution measuring instrument (product name: SALD-2000, manufactured by: Shimadzu Corporation). The volume average of them was calculated, and the obtained value was taken as the volume average particle diameter of the particles.

The volume average particle diameter of the hollow resin particle precursor used to produce the particles, was calculated in the same manner.

(2) Measurement of Density of Particles and Calculation of Void Ratio of Particles A. Measurement of Apparent Density of Particles First, approximately 30 $cm^3$ of the particles were introduced into a measuring flask with a volume of 100 $cm^3$, and the mass of the introduced particles was precisely weighed. Next, the measuring flask in which the particles were introduced, was precisely filled with isopropanol up to the marked line of the flask, while care was taken so that air bubbles did not get in. The mass of the isopropanol added to the measuring flask was precisely weighed, and the apparent density $D_1$ (g/$cm^3$) of the particles was calculated by the following formula (I).

Apparent density $D_1$=[Mass of the particles]/(100−[Mass of the isopropanol]/[Specific gravity of the isopropanol at the measuring temperature])  Formula (I)

B. Measurement of True Density of Particles

The particles were pulverized in advance. Then, approximately 10 g of the pulverized particles were introduced into a measuring flask with a volume of 100 $cm^3$, and the mass of the introduced pulverized particles was precisely weighed.

Then, similarly to the measurement of the apparent density, isopropanol was added to the measuring flask; the mass of the isopropanol was precisely weighed; and the true density $D_0$ (g/$cm^3$) of the particles was calculated by the following formula (II).

True density $D_0$=[Mass of the pulverized particles]/(100−[Mass of the isopropanol]/[Specific gravity of the isopropanol at the measuring temperature])  Formula (II)

C. Calculation of Void Ratio

A value was calculated by the following formula (III), using the apparent density $D_1$ and true density $D_0$ of the hollow resin particles. The value was taken as the void ratio (%) of the hollow resin particles.

Void ratio (%)=100−(Apparent density $D_1$/True density $D_0$)×100  Formula (III)

The measurement and evaluation results of the particles of Production Examples 1 to 4 and Comparative Examples 1 and 2 are shown in the following Table 1, along with the raw material composition of the particles.

TABLE 1

|  |  | Production Example 1 | Production Example 2 | Production Example 3 | Production Example 4 | Comparative Production Example 1 | Comparative Production Example 2 |
|---|---|---|---|---|---|---|---|
| Non-crosslinkable monomer | Methacrylic acid (parts) | 40 | 15 | 30 | 15 | 15 | 20 |
|  | Methyl methacrylate (parts) | — | 25 | 20 | — | 55 | 45 |
|  | Butyl acrylate (parts) | — | 20 | — | — | 15 | 10 |
| Crosslinkable monomer | Ethylene glycol dimethacrylate (parts) | 60 | 40 | — | 85 | 15 | 25 |
|  | Divinyl benzene (parts) | — | — | 50 | — | — | — |

TABLE 1-continued

|  | | Production Example 1 | Production Example 2 | Production Example 3 | Production Example 4 | Comparative Production Example 1 | Comparative Production Example 2 |
|---|---|---|---|---|---|---|---|
| Oil-soluble polymerization initiator (parts) | | 3 | 3 | 3 | 3 | 3 | 3 |
| Organic solvent | Cyclohexane (parts) | 270 | — | 150 | — | 45 | 80 |
| | n-Hexane (parts) | — | 100 | — | 600 | — | — |
| Surfactant (parts) | | 4.0 | 3.0 | 1.0 | 3.0 | 0.8 | 3.0 |
| Ion-exchanged water (parts) | | 800 | 800 | 800 | 800 | 800 | 800 |
| Production method | | Suspension method | Suspension method | Suspension method | Membrane emulsification method | Suspension method | Membrane emulsification method |
| Volume average particle diameter (μm) | | 2.8 | 3.8 | 4.6 | 8.6 | 4.2 | 25.5 |
| Apparent density D1 (g/cm³) | | 0.24 | 0.48 | 0.37 | 0.12 | 0.72 | 0.55 |
| True density D0 (g/cm³) | | 1.20 | 1.20 | 1.19 | 1.19 | 1.19 | 1.20 |
| Void ratio (%) | | 80 | 60 | 69 | 90 | 40 | 55 |

The particles obtained in Production Examples 1 to 4 showed no change in volume average particle diameter, compared to the hollow resin particle precursor before removing the solvent. Accordingly, it is clear that the particles were obtained by removing the cyclohexane included in the hollow resin particle precursor, without expanding the hollow resin particle precursor.

2. Production of Hollow Particles

Example 1

First, 100 parts of the hollow resin particles of Production Example 1 were dispersed in 200 parts of 2-propanol. Then, 20 parts of calcium carbonate (primary particle diameter: 20 run, specific gravity: 2.71) was added as inorganic fine particles (the addition step). They were mixed by stirring for one hour, and then the mixture was filtered. A solid component thus obtained was heated with a vacuum dryer at 150° C. for 6 hours under a vacuum condition. Then, the vacuum condition was changed to a normal pressure condition by nitrogen, and the solid component was cooled to room temperature, thereby obtaining the hollow particles of Example 1. From the scanning electron microscopy result and void ratio of the particles, the particles were confirmed to be in a spherical shape and to have a hollow portion.

Examples 2 to 9 and Comparative Examples 1 to 6

The hollow particles of Examples 2 to 9 and Comparative Examples 1 to 6 were obtained in the same manner as in Example 1, except that at least one of the type of the hollow resin particles, the type of the inorganic fine particles, and the addition amount of the inorganic fine particles was changed.

As the inorganic fine particles, silica fine particles were used in Examples 3, 4, 7 and 9 and Comparative Examples 1, 2 and 6, and alumina fine particles were used in Example 5. The specific gravity of the silica fine particles was 2.2, and the specific gravity of the alumina fine particles was 4.0.

4. Evaluation of Hollow Particles

The following calculation, measurement and evaluation were carried out on the particles of Examples 1 to 9 and Comparative Examples 1 to 6. Details are as follows.

(1) Coverage

From the particle diameter and apparent density (g/cm³) of the hollow resin particles, and also from the particle diameter, specific gravity and addition amount of the inorganic fine particles, the coverage of the inorganic fine particles with respect to the surface area of the obtained hollow particles, was calculated by the following formula (A).

$$R = \{3^{1/2}/2\pi\} \times \{(D \times S)/(d \times s)\} \times n \quad \text{Formula (A)}$$

where "R" means the coverage (%) of the inorganic fine particles with respect to the surface area of the hollow particles; "D" means the volume average particle diameter (nm) of the hollow resin particles; "S" means the apparent density (g/cm³) of the hollow resin particles; "d" means the primary particle diameter (nm) of the inorganic fine particles; "s" means the specific gravity of the inorganic fine particles; and "n" means the addition amount (parts by mass) of the inorganic fine particles.

(2) Evaluation of Dispersibility

The hollow particles were added to ion-exchanged water containing 1% sodium dodecyl sulfate so that the concentration was 5% by mass. The obtained dispersion was subjected to a dispersion treatment for 30 minutes with a high-speed dispersing machine (for example, product name: HOMO DISPER 2.5 TYPE, manufactured by PRIMIX Corporation). Then, the particle size distribution of the hollow particles in the dispersion was measured by using a laser diffraction particle size distribution measuring instrument (product name: SALD-2000, manufactured by Shimadzu Corporation). The evaluation criteria for dispersibility are as follows.

A: In the dispersion, the amount of aggregates having a size of 50 μm or more is less than 0.5% by volume.

B: In the dispersion, the amount of aggregates having a size of 50 μm or more is 0.5% by volume or more and 5% by volume or less.

F: In the dispersion, the amount of aggregates having a size of 50 μm or more is more than 5% by volume.

(3) Evaluation of Heat Resistance

First, the apparent density $D_2$ of the hollow particles before heating was calculated by the following formula (B).

$$D_2 = (100+n)/\{(100/S)+(n/s)\} \quad \text{Formula (B)}$$

where "$D_2$" means the apparent density (g/cm³) of the hollow particles before heating; "S" means the apparent density (g/cm³) of the hollow resin particles; "n" means the addition amount (parts by mass) of the inorganic fine particles; and "s" means the specific gravity of the inorganic fine particles.

Next, the hollow particles were heated as follows. First, 1 g of the hollow particles were added to a tablet forming jig having an inner diameter of 25 nm. While a load of 100 g was applied to the jig, the jig was kept at 200° C. for 3 hours. The jig was returned to roam temperature; the hollow particles were taken out from the jig; and the apparent density $D_3$ after heating was measured by the same method as the above-mentioned "(2) Measurement of density of particle and calculation of void ratio" of "2. Measurement and evaluation of particles".

The increase rate r (%) of the apparent density was calculated by the following formula (C).

$$r=100-100\times\{(D_3-D_2)/D_2\} \quad \text{Formula (C)}$$

where "r" means the increase rate (%) of the apparent density; "$D_2$" means the apparent density (g/cm$^3$) of the hollow particles before heating; and "$D_3$" means the apparent density (g/cm$^3$) of the hollow particles after heating.

The evaluation criteria for heat resistance are as follows.

A: The increase rate r of the apparent density is less than 5%.

B: The increase rate r of the apparent density is 5% or more and 10% or less.

F: The increase rate r of the apparent density is more than 10%.

The measurement and evaluation results of the particles of Examples 1 to 9 and Comparative Examples 1 to 6 are shown in the following Table 2, along with the raw materials (the particles (including the hollow resin particles) and the inorganic fine particles).

5. Consideration

Hereinafter, the evaluation results of the hollow particles will be examined with reference to Tables 1 and 2.

According to Tables 1 and 2, the hollow particles of Comparative Example 1 contain the hollow resin particles of Production Example 1 (volume average particle diameter: 2.8 μm, void ratio: 80%, the content of the crosslinkable monomer unit with respect to 100 parts of the resin: 60 parts) and the silica fine particles (primary particle diameter: 7 nm, addition amount: 5 parts) as the inorganic fine particles.

For the hollow particles of Comparative Example 1, the dispersibility evaluation result is F. The reason is considered as follows: since the primary particle diameter of the silica fine particles is too small, the effect of suppressing contact between the hollow resin particles is small and results in particle aggregation.

According to Tables 1 and 2, the hollow particles of Comparative Example 2 contain the hollow resin particles of Production Example 1 and the silica fine particles (primary particle diameter: 300 nm, addition amount: 50 parts) as the inorganic fine particles.

For the hollow particles of Comparative Example 2, the coverage is 14% and the lowest, and the dispersibility evaluation result is F. The reason is considered as follows: since the primary particle diameter of the silica fine particles is too large, it is difficult to cover the hollow resin particles with the silica fine particles.

According to Tables 1 and 2, the hollow particles of Comparative Example 3 contain the hollow resin particles of

TABLE 2

| | | Inorganic fine particles | | | | Apparent density (g/cm$^3$) | | |
| | | | Primary particle diameter (nm) | Addition amount (parts) | Coverage (%) | Dispersibility | Before heating (D2) | After heating (D3) | Heat resistance |
| | Hollow resin particles | Material | | | | | | | |
|---|---|---|---|---|---|---|---|---|---|
| Example 1 | Production Example 1 | Calcium carbonate | 20 | 20 | 68 | B | 0.283 | 0.289 | A |
| Example 2 | Production Example 2 | Calcium carbonate | 20 | 50 | 171 | A | 0.345 | 0.356 | A |
| Example 3 | Production Example 1 | Silica | 20 | 30 | 126 | A | 0.302 | 0.309 | A |
| Example 4 | Production Example 1 | Silica | 80 | 150 | 158 | A | 0.516 | 0.521 | A |
| Example 5 | Production Example 1 | Alumina | 50 | 120 | 111 | A | 0.493 | 0.502 | A |
| Example 6 | Production Example 2 | Calcium carbonate | 20 | 10 | 95 | A | 0.529 | 0.545 | A |
| Example 7 | Production Example 3 | Silica | 100 | 60 | 128 | A | 0.537 | 0.541 | A |
| Example 8 | Production Example 4 | Calcium carbonate | 20 | 30 | 144 | A | 0.141 | 0.149 | B |
| Example 9 | Production Example 4 | Silica | 80 | 100 | 148 | A | 0.210 | 0.222 | B |
| Comparative Example 1 | Production Example 1 | Silica | 7 | 20 | 241 | F | 0.282 | 0.291 | A |
| Comparative Example 2 | Production Example 1 | Silica | 300 | 50 | 14 | F | 0.341 | 0.350 | A |
| Comparative Example 3 | Production Example 2 | Calcium carbonate | 20 | 3 | 28 | F | 0.502 | 0.511 | A |
| Comparative Example 4 | Production Example 2 | Calcium carbonate | 20 | 200 | 1894 | A | 1.080 | 1.098 | A |
| Comparative Example 5 | Comparative Production Example 1 | Calcium carbonate | 20 | 10 | 152 | A | 0.761 | 0.980 | F |
| Comparative Example 6 | Comparative Production Example 2 | Silica | 50 | 10 | 351 | A | 0.590 | 0.677 | F |

Production Example 2 (volume average particle diameter: 3.8 μm, void ratio: 60%, the content of the crosslinkable monomer unit with respect to 100 parts of the resin: 40 parts) and the calcium carbonate fine particles (primary particle diameter: 20 nm, addition amount: 3 parts) as the inorganic fine particles.

For the hollow particles of Comparative Example 3, the coverage is 28% and low, and the dispersibility evaluation result is F. The reason is considered as follows: since the addition amount of the calcium carbonate fine particles is too small, it is difficult to cover the hollow resin particles with the calcium carbonate fine particles.

According to Tables 1 and 2, the hollow particles of Comparative Example 4 contain the hollow resin particles of Production Example 2 and the calcium carbonate fine particles (primary particle diameter: 20 nm, addition amount: 200 parts) as the inorganic fine particles.

For the hollow particles of Comparative Example 4, the apparent density $D_2$ before heating is 1.080 g/cm³ and excessively high, and the advantages of reducing the weight of the hollow particles cannot be obtained. The reason is considered that the addition amount of the calcium carbonate fine particles having the high specific gravity is too large.

According to Tables 1 and 2, the hollow particles of Comparative Example 5 contain the hollow resin particles of Comparative Production Example 1 (volume average particle diameter: 4.2 μm, void ratio: 40%, the content of the crosslinkable monomer unit with respect to 100 parts of the resin: 15 parts) and the calcium carbonate fine particles (primary particle diameter: 20 nm, addition amount: 10 parts) as the inorganic fine particles.

For the hollow particles of Comparative Example 5, the apparent density $D_2$ before heating is 0.761 g/cm³ and excessively high, and the heat resistance evaluation result is F. The reason is considered as follows: since the content of the crosslinkable monomer unit with respect to 100 parts of the resin is 15 parts and too small, and since the void ratio of the hollow resin particles is 40% and too low, the covalent bond network in the resin is relatively sparse and consequently weak in heat.

According to Tables 1 and 2, the hollow particles of Comparative Example 6 contain the hollow resin particles of Comparative Production Example 2 (volume average particle diameter: 25.5 μm, void ratio: 55%, the content of the crosslinkable monomer unit with respect to 100 parts of the resin: 25 parts) and the silica fine particles (primary particle diameter: 50 nm, addition amount: 10 parts) as the inorganic fine particles.

For the hollow particles of Comparative Example 6, the heat resistance evaluation result is F. The reason is considered as follows: since the volume average particle diameter of the hollow resin particles is 25.5 μm and too large, the mechanical strength of the hollow resin particles is low, and the hollow resin particles are likely to collapse or deform under a high temperature environment and are vulnerable to heat.

According to Tables 1 and 2, the hollow particles of Examples 1 to 9 contain the hollow resin particles (volume average particle diameter: 2.8 μm to 8.6 μm, void ratio: 60% to 90%, the content of the crosslinkable monomer unit with respect to 100 parts of the resin: 40 parts to 85 parts) and various kinds of inorganic fine particles (primary particle diameter: 20 nm to 100 nm, addition amount: 10 parts to 150 parts).

For the hollow particles of Examples 1 to 9, the coverage is from 68% to 171% and high; the dispersibility evaluation result is B or more; the apparent density $D_2$ before heating is from 0.141 g/cm³ to 0.537 g/cm³ and low; and the heat resistance evaluation result is B or more.

Therefore, it was proven that the hollow particles of Examples 1 to 9 (the volume average particle diameter is from 0.1 μm to 9.0 μm; the void ratio is from 55% to 95%; the repeating unit constituting the resin of the hollow resin particles contains the crosslinkable monomer unit, and the content of the crosslinkable monomer unit is from 25 parts by mass to 100 parts by mass with respect to 100 parts by mass of the resin; the primary particle diameter of the inorganic fine particles is from 10 nm to 120 nm; and the inorganic fine particles are contained at from 5 parts by mass to 180 parts by mass with respect to 100 parts by mass of the hollow resin particles) are particles which are more excellent in heat resistance and dispersibility than ever before and which are lightweight.

Further, since the hollow resin particles used in Examples 1 to 9 were obtained by removing the cyclohexane included in the hollow resin particle precursor without expanding the hollow resin particle precursor, the hollow particles of Examples 1 to 9 were excellent in the uniformity of the void ratio.

REFERENCE SYMBOLS LIST

1. Aqueous medium
2. Low polarity material
3. Surfactant
4. Monomer composition
4a. Monomer dispersed in aqueous medium
5. Oil-soluble polymerization initiator
6. Shell
7. Organic Solvent
8. Hollow portion
9. Inorganic fine particle
10. Micelle
20. Hollow resin particle precursor
30. Hollow rein particle
51. Aqueous medium
52. Surfactant
53. Monomer composition
53a. Monomer dissolved out to aqueous medium
54. Water-soluble polymerization initiator
60. Micelle
60a. Micelle precursor
61. Core resin particle
62. Shell
63. Hollow core
64. Hollow portion
100. Hollow particle
200B. Core-shell particle
200C. Hollow particle

The invention claimed is:
1. Hollow particles comprising hollow resin particles having a surface covered with inorganic fine particles,
wherein a volume average particle diameter of the hollow particles is from 0.1 μm to 9.0 μm, and a void ratio thereof is from 55% to 95%;
wherein a repeating unit constituting the resin of the hollow resin particles contains a crosslinkable monomer unit, and a content of the crosslinkable monomer unit is from 25 parts by mass to 100 parts by mass, with respect to 100 parts by mass of the resin;
wherein a primary particle diameter of the inorganic fine particles is from 10 nm to 120 nm; and wherein the inorganic fine particles are contained at from 5 parts by mass to 180 parts by mass, with respect to 100 parts by mass of the hollow resin particles.

2. The hollow particles according to claim 1, wherein a coverage of the hollow particles with the inorganic fine particles is from 60% to 180%.

3. The hollow particles according to claim 1, wherein a specific gravity of the inorganic fine particles is from 1.5 to 4.5.

4. The hollow particles according to claim 1, wherein a ratio of a volume average particle diameter of the hollow particles to a primary particle diameter of the inorganic fine particles (the volume average particle diameter of the hollow particles/the primary particle diameter of the inorganic fine particles) is 10 or more.

5. An aqueous dispersion comprising the hollow particles defined by claim 1.

6. A method for producing the hollow particles defined by claim 1, the method comprising a step comprising obtaining the hollow resin particles by, without expanding a hollow resin particle precursor including an organic solvent, removing the organic solvent from the hollow resin particle precursor.

7. The method for producing the hollow particles according to claim 6, the method further comprising a step comprising adding the inorganic fine particles on a surface of the hollow resin particles.

* * * * *